Patented Mar. 25, 1952

2,590,639

UNITED STATES PATENT OFFICE 2,590,639

AZO DYESTUFF

Eduard Moser, Basel, Switzerland, assignor to Ciba Limited, Basel, Switzerland, a Swiss firm No Drawing. Application November 29, 1949, Serial No. 130,075. In Switzerland December 7, 1948

1 Claim. (Cl. 260—193)

This invention is concerned with a new azo dyestuff of the water-insoluble series. More particularly this invention provides a new valuable yellow azo dyestuff.

It is well known in the art that many simple diazo compounds of the benzene series yield yellow dyestuffs if combined with certain acetoacetic acid arylides. However, most of these old dyestuffs are defective in one way or another, some being of insufficient fastness to light, some producing less desirable shades of yellow either on the reddish or on the greenish side, some even producing a dull shade of yellow.

According to this invention a very valuable water-insoluble azo dyestuff is obtained by coupling in substance on the fiber or in the presence of a suitable substratum other than textile fibers the acetoacetic arylide of the formula

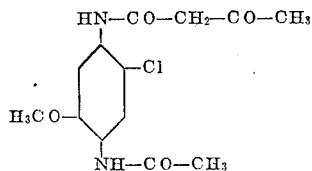

with a diazo compound of 1-amino-2-methyl-4-chlorobenzene.

The acetoacetic arylide of the above formula can be obtained in known manner by condensing acetoacetic ethyl ester with 1-amino-2-chloro-4-acetylamino-5-methoxybenzene.

The coupling reaction is conveniently carried out in a neutral to alkaline medium preferably in the presence of the substratum sought to be dyed for example according to the so-called ice color method, but if the dyestuff itself is desired the coupling reaction may as well be carried out in an aqueous medium free from any substratum.

For printing purposes it may be convenient to use the diazo component in the form of a diazo-amino-compound which under printing conditions undergoes cleavage thereby yielding the desired diazo compound.

The new dyestuff corresponds to the formula

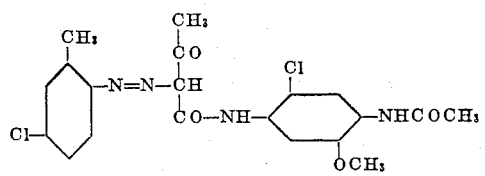

and is distinguished by good properties of fastness, especially by a very good fastness to light, and by a valuable yellow tint which is neither reddish nor greenish.

The following example illustrates the invention, the parts being by weight:

*Example*

A printing paste of the following composition is prepared:

30 parts of 1-acetoacetylamino-4-acetylamino-2-chloro-5-methoxybenzene,
29 parts of the diazo-amino-compound from diazotized 1 - amino - 2-methyl-4-chlorobenzene and sodium methylaminoethane sulfonate,
40 parts of Turkey Red oil,
20 parts of ethyl alcohol,
30 parts of caustic soda solution of 30 per cent strength,
251 parts of water,
600 parts of starch-tragacanth thickening.

1000 parts

A cotton fabric is printed with the above paste. The printed material is dried at 50–60° C., and then steamed in a Mather-Platt apparatus for 5 minutes at 100° C. under acid conditions. It is then rinsed in the cold, and treated for 10 minutes at 40–50° C. with an enzyme preparation in order to remove the starch. It is then again rinsed in the cold, soaped at the boil for 10 minutes, again rinsed, and then dried. There are obtained pure yellow prints which are fast to boiling and chlorine and are distinguished by an excellent fastness to light.

What I claim is:

The new dyestuff which corresponds to the formula

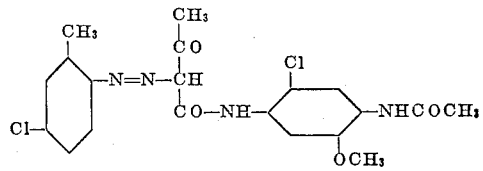

and is distinguished by good properties of fastness especially by a very good fastness to light, and by a valuable yellow tint which is neither reddish nor greenish.

EDUARD MOSER.

REFERENCES CITED

The following references are of record in the file of this patent:

FOREIGN PATENTS

| Number | Country | Date |
|---|---|---|
| 457,825 | Great Britain | Dec. 7, 1936 |